(12) United States Patent
Nakagawa et al.

(10) Patent No.: US 6,176,338 B1
(45) Date of Patent: Jan. 23, 2001

(54) BATTERY RECEPTACLE STRUCTURE IN A TWO-WHEELED MOTOR VEHICLE

(75) Inventors: Mitsuo Nakagawa; Toru Takeda, both of Wako (JP)

(73) Assignee: Honda Giken Kogyo Kabushiki Kaisha, Tokyo (JP)

(*) Notice: Under 35 U.S.C. 154(b), the term of this patent shall be extended for 0 days.

(21) Appl. No.: 09/149,569

(22) Filed: Sep. 9, 1998

(30) Foreign Application Priority Data

Sep. 13, 1997 (JP) .................................................. 9-268022

(51) Int. Cl.[7] ............................ B60R 16/04; B62D 61/02
(52) U.S. Cl. .......................................... 180/219; 180/68.5
(58) Field of Search .................................. 180/218, 219, 180/65.1, 68.5, 220

(56) References Cited

U.S. PATENT DOCUMENTS

| | | | |
|---|---|---|---|
| 4,487,283 | * 12/1984 | Suzuki et al. | 180/219 |
| 4,700,795 | * 10/1987 | Yashima et al. | 180/68.5 |
| 4,707,884 | * 11/1987 | Chang | 16/113 |
| 5,513,721 | * 5/1996 | Ogawa et al. | 180/220 |
| 5,853,058 | * 12/1998 | Endo et al. | 180/65.1 |

FOREIGN PATENT DOCUMENTS

| | | | | |
|---|---|---|---|---|
| 403243484 | * | 10/1991 | (JP) | B62J/11/00 |
| 404024185 | * | 1/1992 | (JP) | B62J/39/00 |
| 404358984 | * | 12/1992 | (JP) | B62M/7/02 |
| 405105148 | * | 4/1993 | (JP) | B62J/11/00 |
| 405185886 | * | 7/1993 | (JP) | B60R/11/04 |
| 406135371 | * | 5/1994 | (JP) | B62M/7/06 |
| 8-175477 | | 7/1996 | (JP) | . |

* cited by examiner

*Primary Examiner*—Brian L. Johnson
*Assistant Examiner*—Tony Winner

(57) ABSTRACT

A power unit including a motor is connected to a vehicle body frame. The vehicle body frame extends downward from a head pipe, and is provided with a pair of frames substantially parallel to the ground surface. A control unit receptacle case for driving the motor is fixed to span between the paired right and left frames. Batteries for the supply of electric power to the motor are mounted on the control unit. The control unit serves also as a bottom plate between the paired right and left frames and can carry batteries thereon. Therefore, the use of an additional frame or member for the mounting of batteries is not required, thus permitting a reduction in the vehicle body weight and the number of components used. Since the control unit closes the bottom of the main frame, the rigidity of the main frame is enhanced.

20 Claims, 13 Drawing Sheets

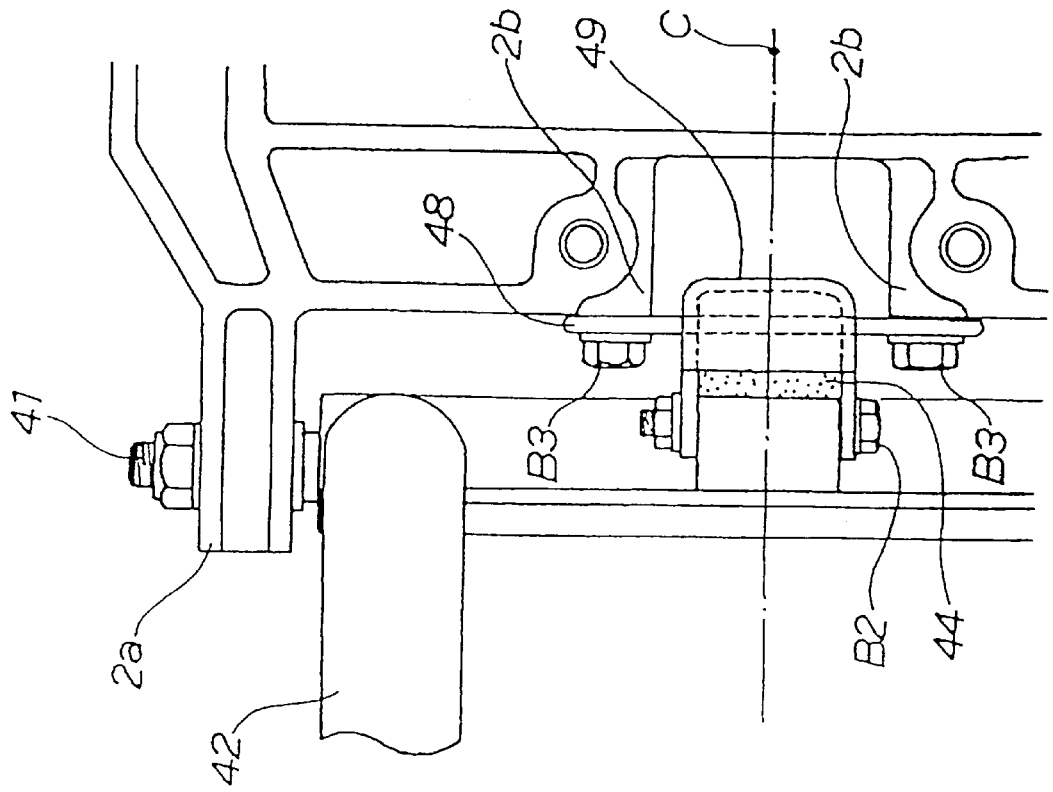
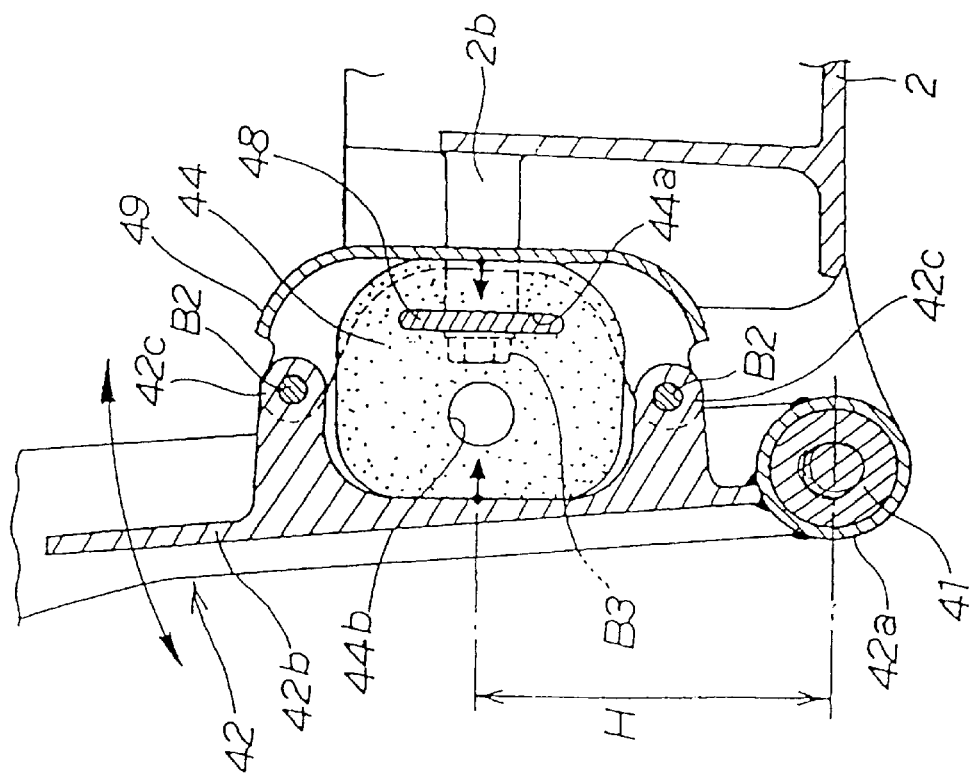

BATTERY RECEPTACLE STRUCTURE IN A TWO-WHEELED MOTOR VEHICLE

BACKGROUND OF THE INVENTION

1. Field of the Invention

The present invention relates to a battery receptacle structure in a two-wheeled motor vehicle.

2. Description of the Background Art

A battery receptacle structure in a two-wheeled motor vehicle is shown, for example, in FIG. 1 of Japanese Patent Laid Open No. 175477/96 entitled "An Engine-Motor Power Switching Device in a Two-wheeled Motor Vehicle or the like," in which a battery 6 (this and the following reference numerals mentioned in connection with the above unexamined publication are quoted from the same publication) is accommodated below a foot rest 38 of a vehicle body frame 2.

Since the total load of the heavy battery 6 is imposed on the vehicle body frame 2, the body frame must be very rigid. However, as the rigidity of the body frame is enhanced, its weight becomes heavier.

SUMMARY OF THE INVENTION

It is therefore an object of the present invention to provide a battery receptacle structure for the purpose of reducing the weight of the vehicle body frame It is a further object of the present invention to provide a battery receptacle structure which reduces the weight of the vehicle body frame while maintaining the frame rigidity.

These and other objects of the present invention are achieved by a battery receptacle structure for a motorcycle including a main frame portion extending generally horizontally, the main frame portion including a pair of laterally spaced-apart side frame members, a front cross member interconnecting forward portions of each of the side frame members, and a rear cross member interconnecting rearward portions of each of the side frame members. A head pipe extends upwardly from the main frame portion. A battery receiving area is located on the main frame portion generally between the side frame members.

A control unit serves as a bottom plate between the paired side frame members and permits batteries to be carried thereon. Therefore, it is no longer necessary to use a separate frame or member for carrying batteries thereon. Accordingly, the weight of the vehicle body and the number of components used are reduced.

Because the control unit closes the bottom of the main frame, the rigidity of the main frame is enhanced. Further, since the control unit is exposed below the main frame, the heat generated in the control unit is dissipated and effectively cooled by the air traveling therepast.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein:

FIGS. 7(a) and 7(b) are views showing a structure for mounting a resin spring relating to the present invention;

DETAILED DESCRIPTION OF THE PREFERRED EMBODIMENTS

An embodiment of the present invention will be described hereinunder with reference to the accompanying drawings. In the following description, "front", "rear", "left", "right", "upper" and "lower" represent respective directions as seen from the rider side, and Fr, Rr, L and R stand for front side, rear side, left side and right side, respectively. Further, it is assumed that the drawings should be seen in the directions of these symbols.

Figure 1:
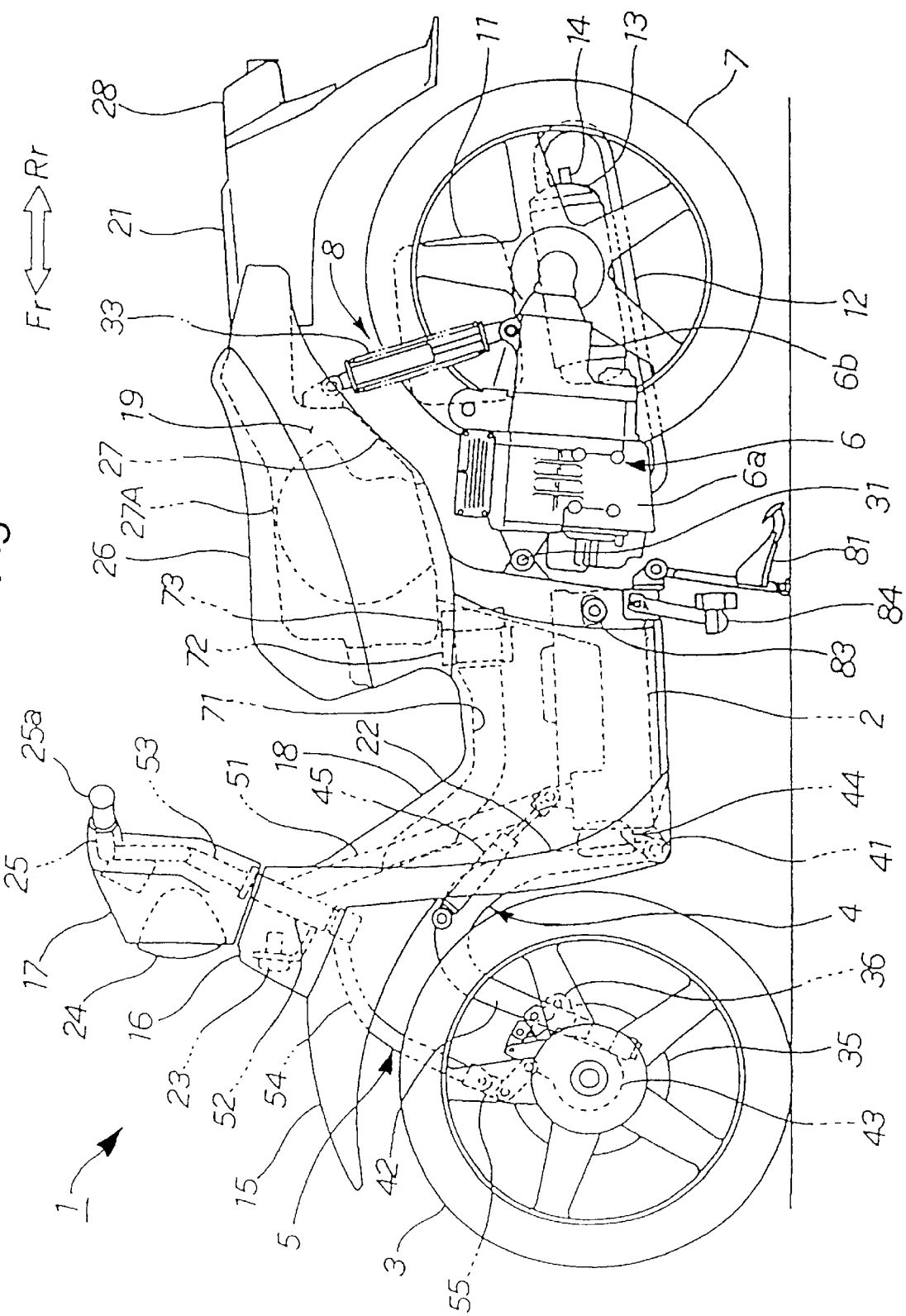
FIG. 1 is a side view of a two-wheeled motor vehicle relating to the present invention.

Referring now to FIG. 1, a two-wheeled motor vehicle 1 is shown. The two-wheeled motor vehicle 1 includes a main frame 2, which also serves as a battery receptacle box which is disposed at a lower central position thereof. A swing arm type front suspension system 4 which suspends a front wheel 3, and a steering system 5 separate from the front suspension system 4, are attached to the front portion of the main frame 2. Further, a power unit 6 and a rear suspension system 8 which suspends a rear wheel 7 are attached to the rear portion of the main frame 2.

The power unit 6 includes an engine 6a and a transmission motor 6b as drive sources. The front wheel 3 and the rear wheel 7 are wheels of a large diameter, typically 14 to 20 inches in diameter. In the inner part of the rear wheel 7 in the figure, there are mounted an air cleaner 11, an exhaust pipe 12, a muffler 13 and a tail pipe 14. The vehicle body is covered with a front fender 15, a front cover 16, a front handle cover 17, a center cowl 18, a rear cowl 19, and a rear fender 21, successively from the front to the rear.

As shown in FIG. 1, the two-wheeled motor vehicle 1 further includes a leg shield 22, a horn 23, a front lamp 24, a handle bar 25, a seat 26, a helmet box 27 for receiving a helmet 27A, a tail lamp 28, an air duct 71, a radiator 72, and a fan 73.

Figure 2:
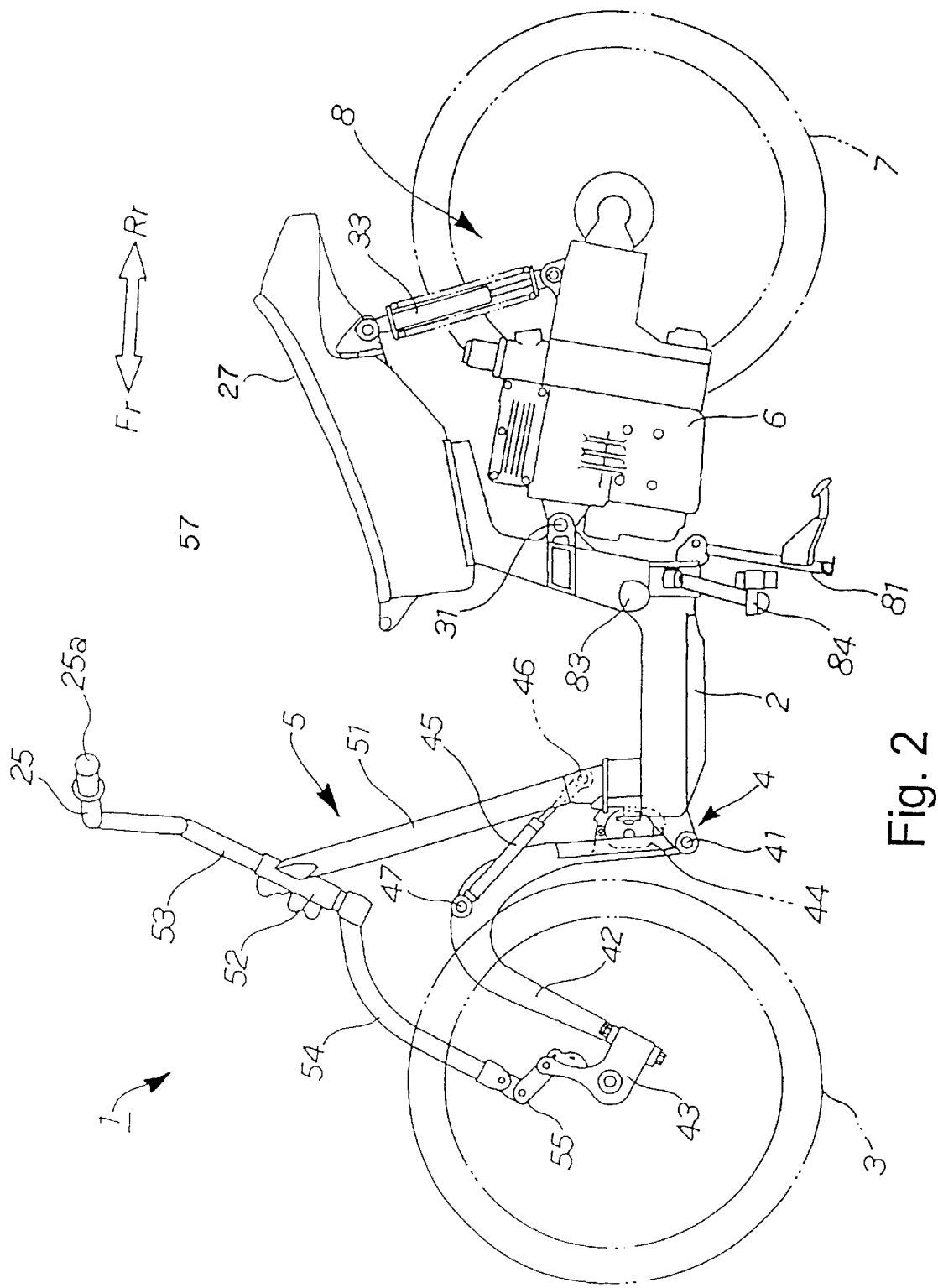
FIG. 2 is a side view of a main frame relating to the present invention and the vicinity thereof.

Reference will now be made to FIG. 2 and the power unit 6 and the rear suspension system 8. The power unit 6 is connected to an upper position of the rear portion of the main frame 2 swingably through a rear pivot shaft 31. The rear wheel 7 is mounted to the power unit 6. Further, a helmet box 27 is secured on top of the rear portion of the main frame 2. A rear cushioning device 33 is attached to the helmet box 27 on the left side of the rear wheel 7.

The main frame 2 disposed at a lower front position of the two-wheeled motor vehicle 1, the helmet box 27 disposed on top of the rear portion of the main frame 2, and a head pipe post 51 disposed on top of the front portion of the main frame, comprise a vehicle body frame 57.

Figure 3:
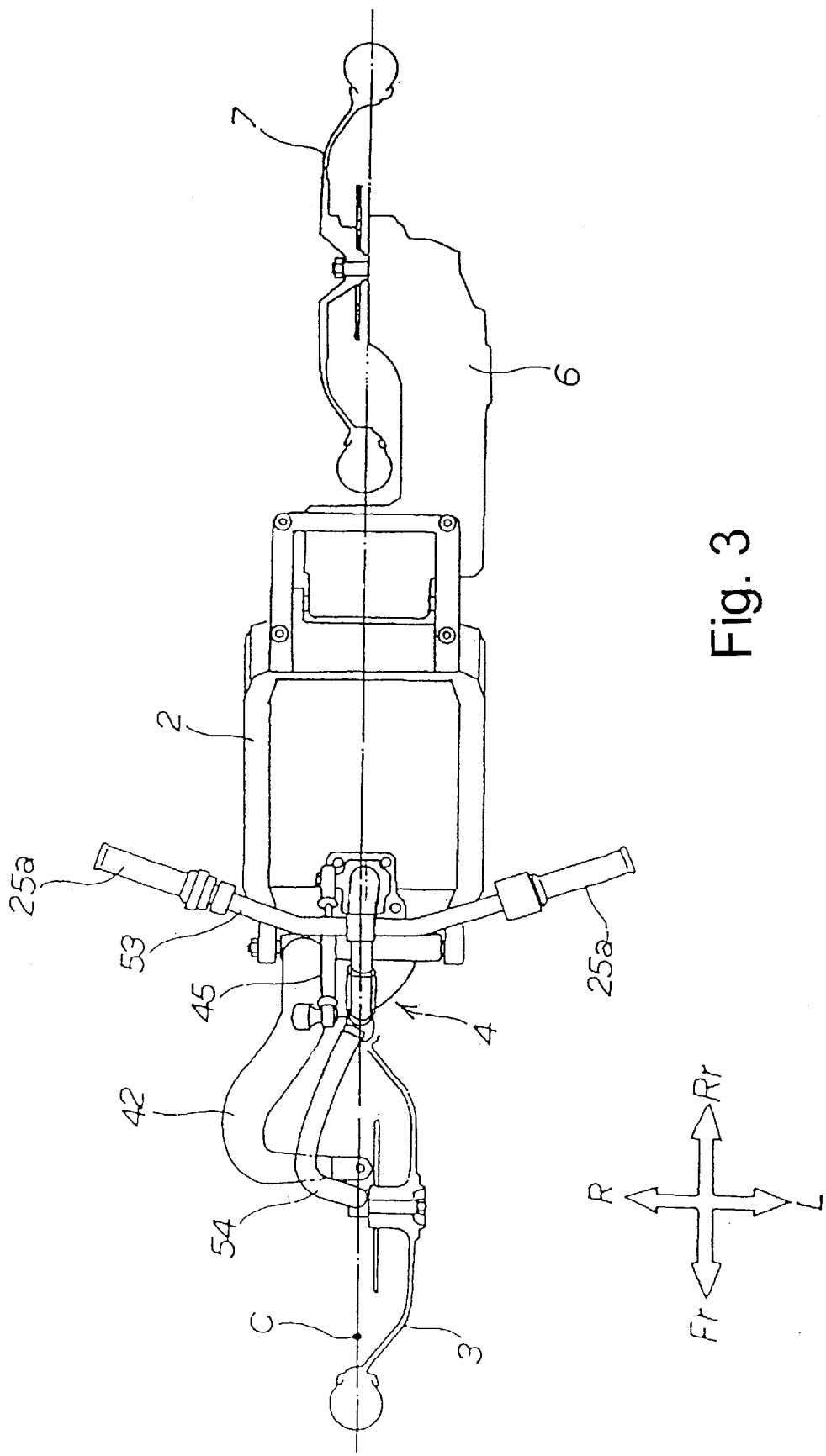
FIG. 3 is a plan view of the main frame, front and rear suspension systems and a steering system relating to the present invention.

FIG. 3 is a plan view of the main frame, front-rear suspension system and steering system which are used in the present invention. A front swing arm 42 in the front suspension system 4, which will be described later, extends forward from the front portion of the main frame 2 to support the front wheel 3 in a cantilevered state. At the other end, the power unit 6 extends backward from the rear portion of the main frame 2 to support the rear wheel 7 in a cantilevered state.

The front swing arm 42 is offset to one side (the right-hand side) from the center C of the vehicle body, while the power unit 6 is offset to the other side (the left-hand side) from vehicle body center C, so that the vehicle 1 is well balanced in weight right and left.

Figure 4:
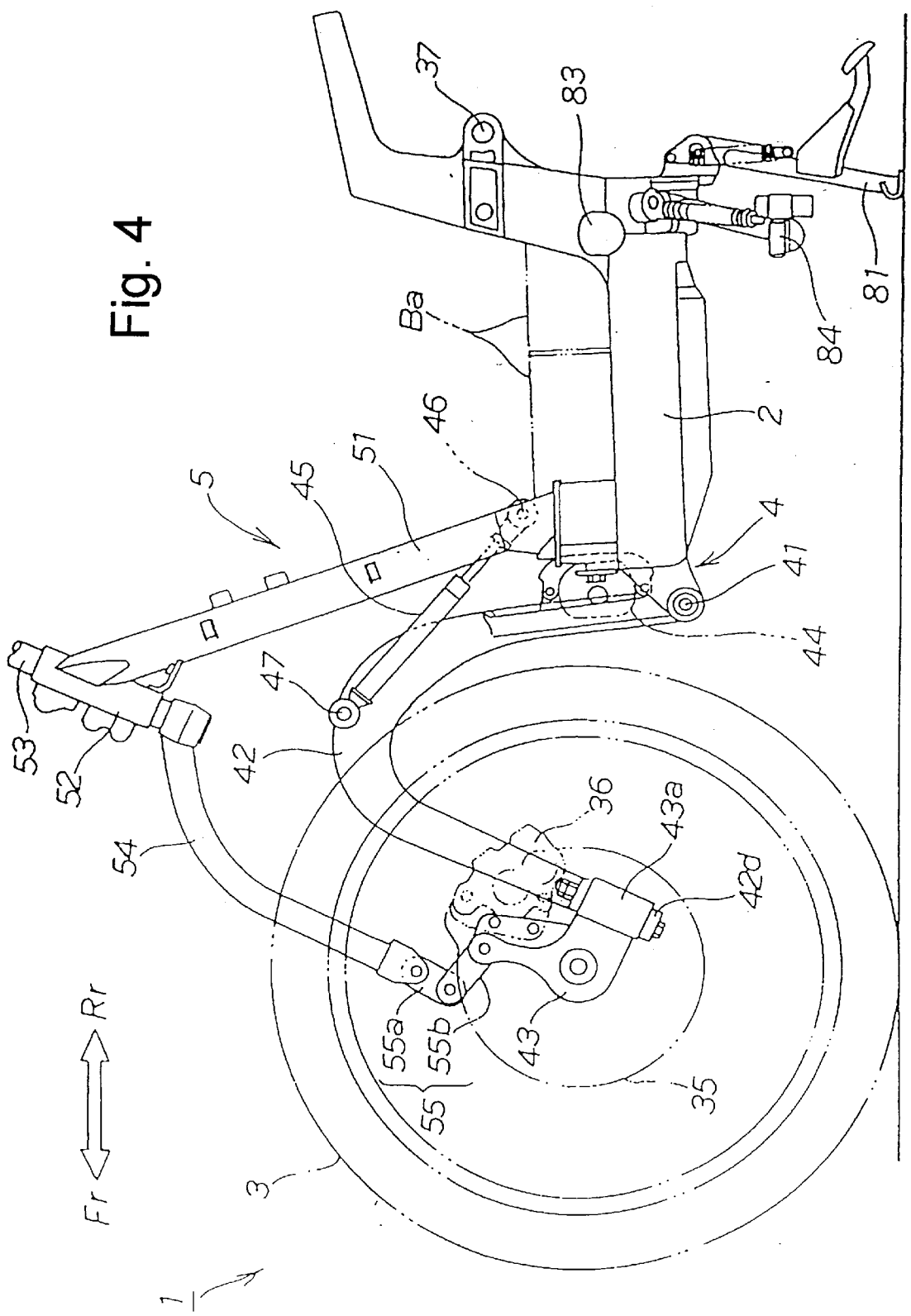
FIG. 4 is a side view of the main frame, front suspension system and steering system relating to the present invention.

FIG. 4 is a side view of the main frame, front suspension system and steering system which are used in the present invention. In the front suspension system 4, the front swing arm 42, which is generally in an inverted U-shape in side view, extends from a lower position of the front portion of the main frame 2 through a front pivot shaft 41, and the front wheel 3 is connected rotatably to the front swing arm 42. To be more specific, a knuckle 43 attached to the front wheel 3 is connected to the front end of the front swing arm 42 in a right and left rotatable manner.

The front suspension system 4 also includes a buffer member 44 for cushioning a shock from the road surface in the swing direction of the swing arm 42. A front damper 45 is also provided for damping the vibration amplitude in the swing direction of the swing arm 42. The buffer member 44 and the front damper 45 are separated from each other. The buffer member 44 comprises a resin spring for cushioning a shock in the swing direction of the swing arm 42, and is disposed between the main frame 2 and the front swing arm 42.

The front damper 45 is mounted between the main frame 2 and the front swing arm 42. More specifically, one end portion of the front damper 45 is secured with a pivot shaft 46 to the right side portion (the back side in the figure) of the base end of the head pipe post 51 which will be described later, while the opposite end portion of the front damper 45 is secured with a pivot shaft 47 to the left side portion of the top of the swing arm 42. One end portion of the front damper 45 may be mounted directly to the main frame 2.

In the steering system 5, the head pipe post 51 extends obliquely upward from the top of the front portion of the main frame 2. A head pipe 52 is fixed to the upper end of the head pipe post 51. A handle post 53 is rotatably fitted in the head pipe 52. A steering arm 54 is secured to the lower end of the handle post 53, and the front end (lower end) of the steering arm 54 is connected to the knuckle 43 through a link mechanism 55.

The link mechanism 55 is comprised of a combination of a first link 55a connected to the front end of the steering arm 54 and a second link 55b connected to the knuckle 43. The link mechanism 55 is disposed inside the front wheel 3 which is relatively large in diameter.

Since the link mechanism 55 is disposed within the front wheel 3, it is possible to attain an effective utilization of space. Also, it is possible to ensure a sufficient space below and behind the head pipe 52. Thus, the design freedom of the two-wheeled motor vehicle 1 is enhanced. In the case of a scooter type two-wheeled motor vehicle wherein a rider step 83 is removed from the vehicle 1 and the rider puts his or her feet on a low floor type foot rest (step floor) in an orderly manner, it is possible to ensure a sufficient space around the rider's feet.

A front brake disk 35 is also provides, as well as a caliper 36 which is secured to the knuckle 43. A bearing 37 is provided for supporting the rear pivot shaft 31. (see FIG. 2). A main stand 81, the rider step 83 and a side stand 84 are mounted to lower positions of the rear portion of the main frame 2.

Figure 5:
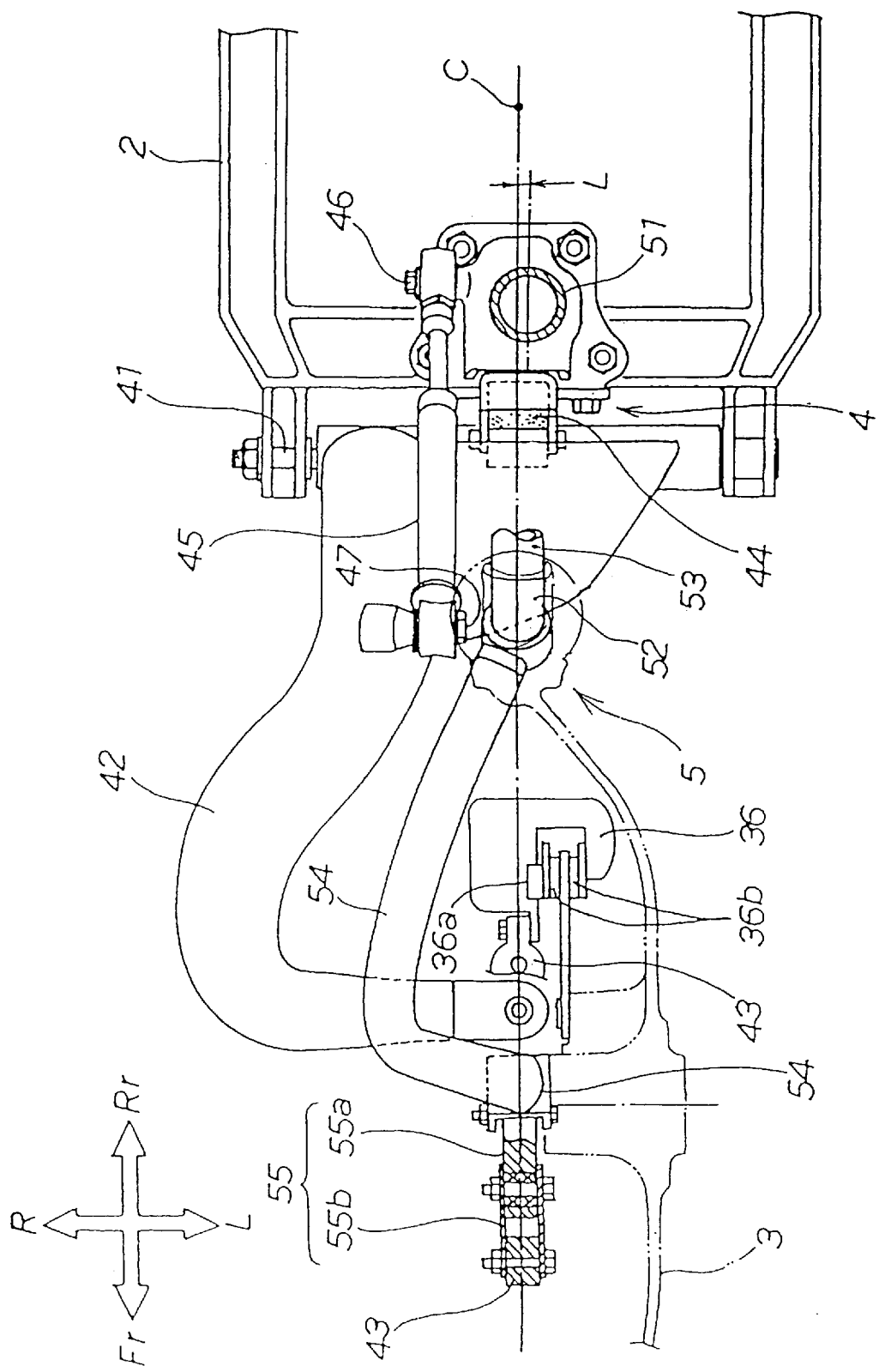
FIG. 5 is a plan view of the main frame, front suspension system and steering system relating to the present invention.

FIG. 5 is a plan view of the main frame, front suspension system and steering system used in the present invention, in which the link mechanism 55 is shown in a developed state. The swing arm 42 extends forward from the right-hand side of the front portion of the main frame 2 through the front pivot shaft 41 while curving rightward so as to bypass the front wheel 3. On the other hand, as shown in FIG. 5, the steering arm 54 extends forward from the lower end of the handle post 53 which lies at the vehicle body center (center line) C, while curving rightward in a bypassing relation to the front wheel 3.

In FIG. 5, moreover, the center of the head pipe post 51 is offset a distance L to one side (left side) from the vehicle body center C. Also, the front damper 45 is disposed on the other side (right side) of the vehicle body center C and adjacently to the head pipe post 51. The front damper 45 extends in parallel with the vehicle body center C. According to this arrangement, since the front damper 45 can be positioned as close as possible to the vehicle body center C, it is possible to minimize a bending moment acting on the front damper 45. Consequently, it is permissible to decrease the strength of the front damper 45, and hence it is possible to make the front damper in a compact size and shape. This is suitable for the swing arm mechanism in the front portion where the space is limited. The resin spring 44 is disposed at the vehicle body center C. Numeral 36a denotes a piston and numeral 36b denotes a brake pad.

Figure 6:
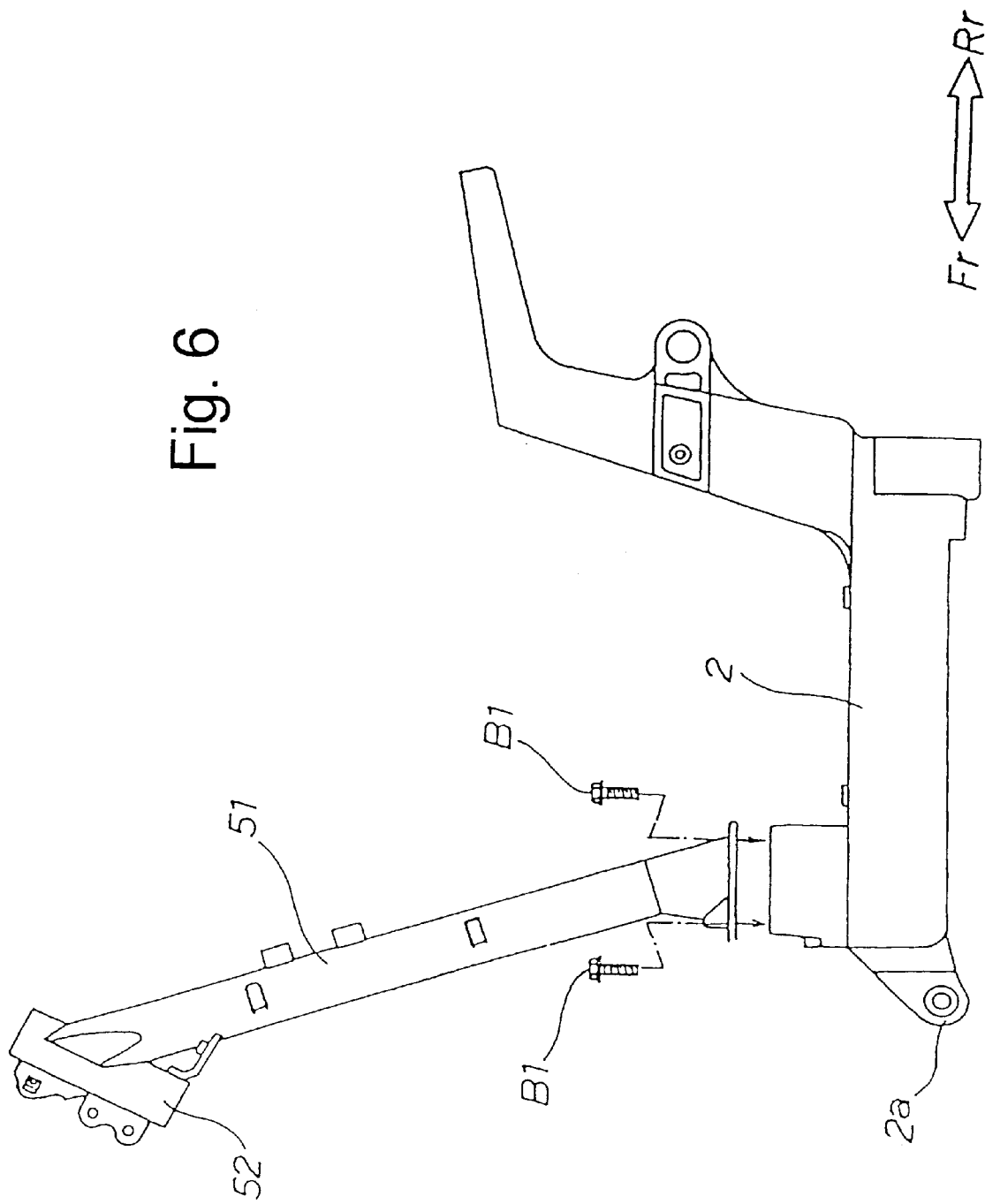
FIG. 6 is an exploded side view of the main frame and a head pipe post relating to the present invention.

FIG. 6 is an exploded side view of the main frame and the head pipe post both used in the present invention. Generally, the caster angle of the steering varies somewhat depending on the vehicle model. Therefore, in the case of a vehicle body frame having a head pipe integral therewith, it is required to replace the entire vehicle body frame with a new one at every change of the caster angle. However, in the present embodiment, the main frame 2 and the head pipe post 51 are separated from each other. The head pipe post 51 is secured to the main frame 2 with a plurality of bolts B1. Also, the main frame 2 serves as a battery receptacle box for enhancing its versatility and is fabricated by casting an aluminum alloy for enhancing its rigidity.

By adopting such a structure, even when the vehicle model changes from one to another, the main frame 2 can be used in common, and all that is required is a mere replacement of only the head pipe post 51. Thus, the design freedom is enhanced.

Further, as shown in FIG. 4, the front suspension system 4 is a swing arm type so that a large load from the front wheel 3 is borne by the main frame 2 of a high rigidity through both front swing arm 42 and front pivot shaft 41. This arrangement makes it possible for the main frame 2 to bear such a large load positively and effectively. In other words, any large load is imposed on the head pipe post 51.

Even in the case where the two-wheeled motor vehicle 1 is a scooter type vehicle wherein the rider step 83 is removed from the vehicle 1 and the rider puts his or her feet on a low floor type foot rest (step floor) in an orderly manner, a large load from the front wheel 3 can be borne by the highly rigid main frame 2 through the front pivot shaft 41.

FIGS. 7(a) and 7(b) illustrate a resin spring mounting structure in the present invention. The resin spring 44 is a block made of resin having resilience in order to exhibit a spring action. It has two through-holes formed in the transverse direction, thosl being a mounting hole 44a and a spring force setting hole 44b. The resin spring 44 is attached to the front portion of the main frame 2 at a position spaced above a predetermined distance H from the front pivot shaft 41.

To be more specific, according to the structure for mounting the resin spring 44, a mounting plate 48 is inserted into the mounting hole 44a of the resin spring 44 and is attached to the front portion of the main frame 2. On the other hand, the front and the rear of the resin spring 44 are sandwiched in between the back of the front swing arm 42 and a holding plate 49 attached to the back of the front swing arm 42.

Figure 8:
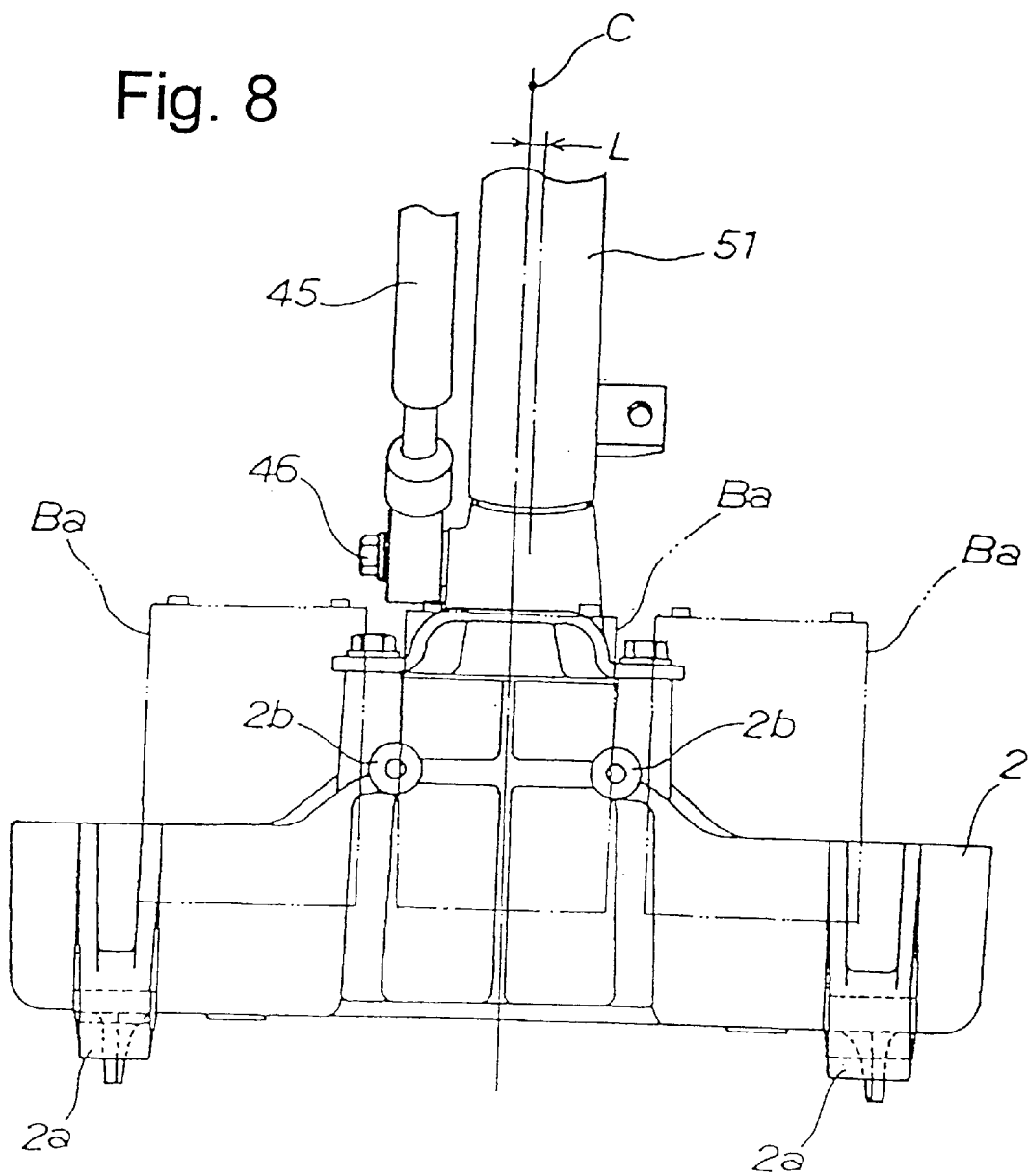
FIG. 8 is a front view of the main frame and the head nine post.

FIG. 8 is a front view of the main frame and the head pipe post both used in the present invention, showing a structure in which one end portion of the front damper 45 is secured with the pivot shaft 46 to the right-hand side of the base portion of the head pipe post 51. Bearings 2a are used to support the front pivot shaft 41, and mounting portions 2b are provided on the resin spring mounting plate 48.

Figure 9:
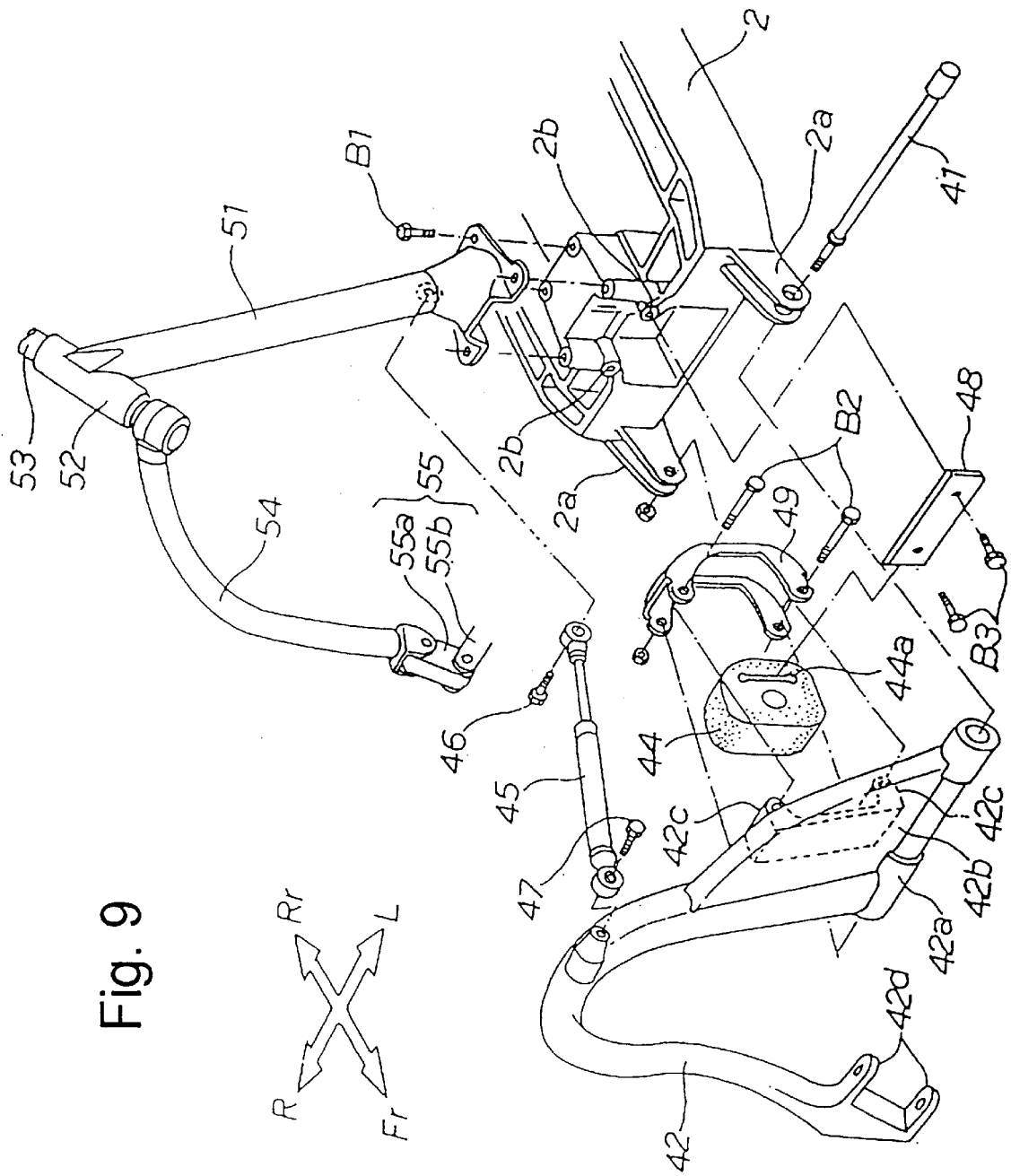
FIG. 9 is an exploded perspective view of the main frame, front suspension system and steering system.

FIG. 9 is an exploded perspective view of the main frame, front suspension system and steering system used in the present invention. This figure illustrates in more detail the construction of the front suspension system 4 and the steering system 5. As shown therein, a support pipe 42a of the front swing arm 42 is connected to the right and left bearings 2a, 2a of the main frame 2 through the front pivot shaft 41. The holding plate 49 is connected with two upper and lower bolts B2, B2 to connections 42c, 42c formed on a plate portion 42b of the front swing arm 42. The resin spring 44 is sandwiched in between the back of the plate portion 42b and the holding plate 49.

The mounting plate 48 is inserted into the mounting hole 44a formed in the resin spring 44, and both right and left end portions of the mounting plate 48 are secured to the mounting portions 2b, 2b of the main frame 2 with bolts B3, B3. Further, the head pipe post 51 is secured to an upper position of the front portion of the main frame 2 with bolts B1. The opposite end portion of the front damper 45 is connected to the top of the front swing arm 42 with the pivot shaft 47. The head pipe 52 is provided at the upper end of the head pipe post 51. The handle post 53 is rotatably fitted in the head pipe 52. The steering arm 54 is connected to the lower end of the handle post 53, and the link mechanism 55 is connected to the front end of the steering arm 54. The swing arm 42 is provided at the front end thereof with a stem support member 42d for mounting a stem shaft 43a (see FIG. 4) of the knuckle 43.

Figure 10:
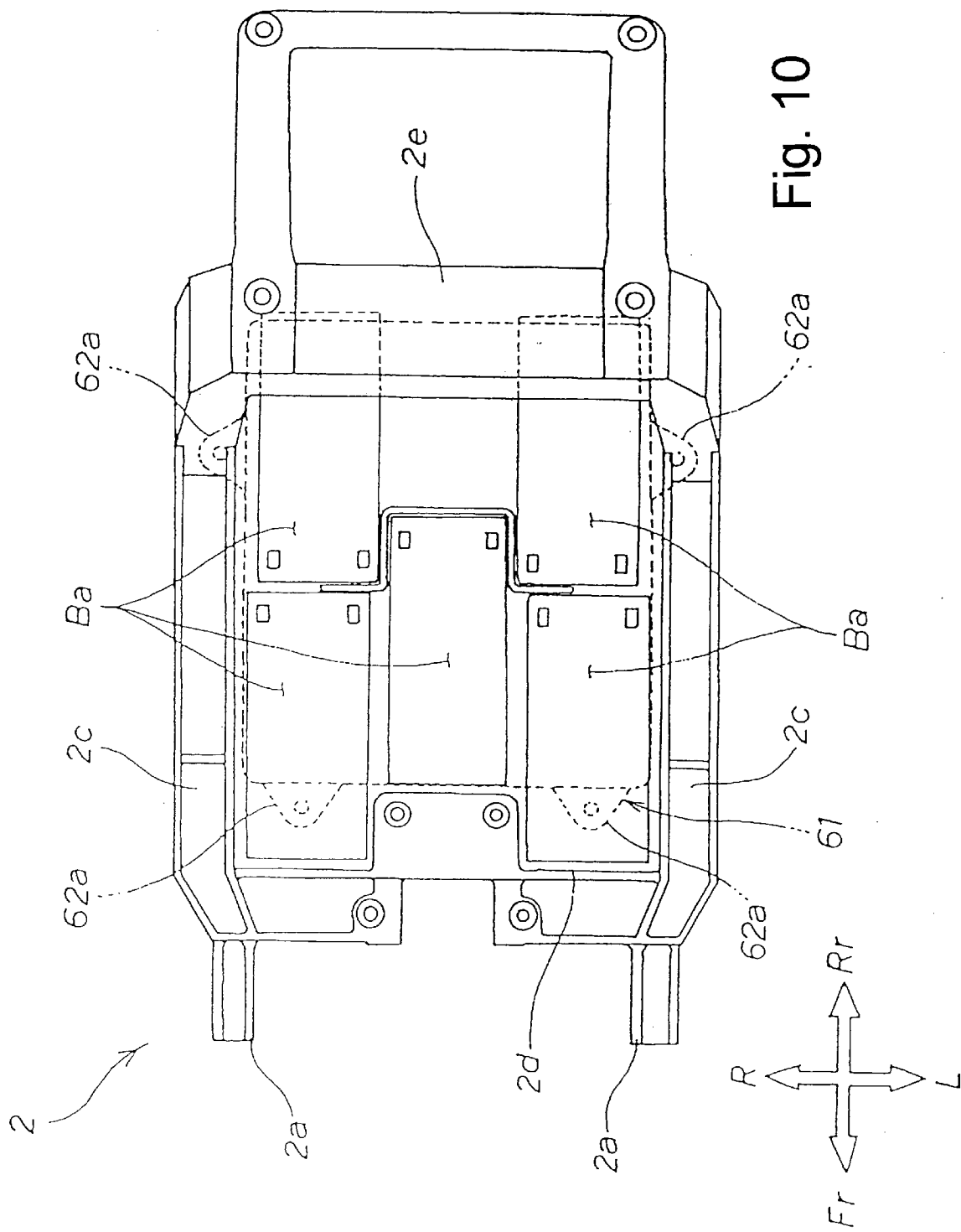
FIG. 10 is a plan view of the main frame with batteries mounted thereon.

FIG. 10 is a plan view of the main frame 2 according to the present invention with a plurality of batteries Ba mounted thereon. The plural batteries Ba are disposed at lower positions of the front portion of the vehicle body frame 57. More specifically, in the main frame 2, right and left side members 2c, 2c extend longitudinally on both sides of the vehicle body. Front ends of the right and left side members 2c, 2c are connected together through a front cross member 2d. Further, the rear ends of the right and left side members 2c, 2c are connected together through a rear cross member 2e which is in the shape of a gateway when seen from the back thereof.

Thus, according to the shape of the main frame 2, its central bottom comes out except its front portion. A receptacle case 61, which also serves as a bottom plate, is mounted to the main frame 2 and most of the five batteries Ba are put on the bottom plate. The plural batteries Ba are for the supply of electric power to the motor 6b shown in FIG. 1. The batteries Ba are arranged transversely between the right and left side members 2c, 2c in three rows, and they are arranged longitudinally in two rows in a zigzag fashion.

Figure 11:
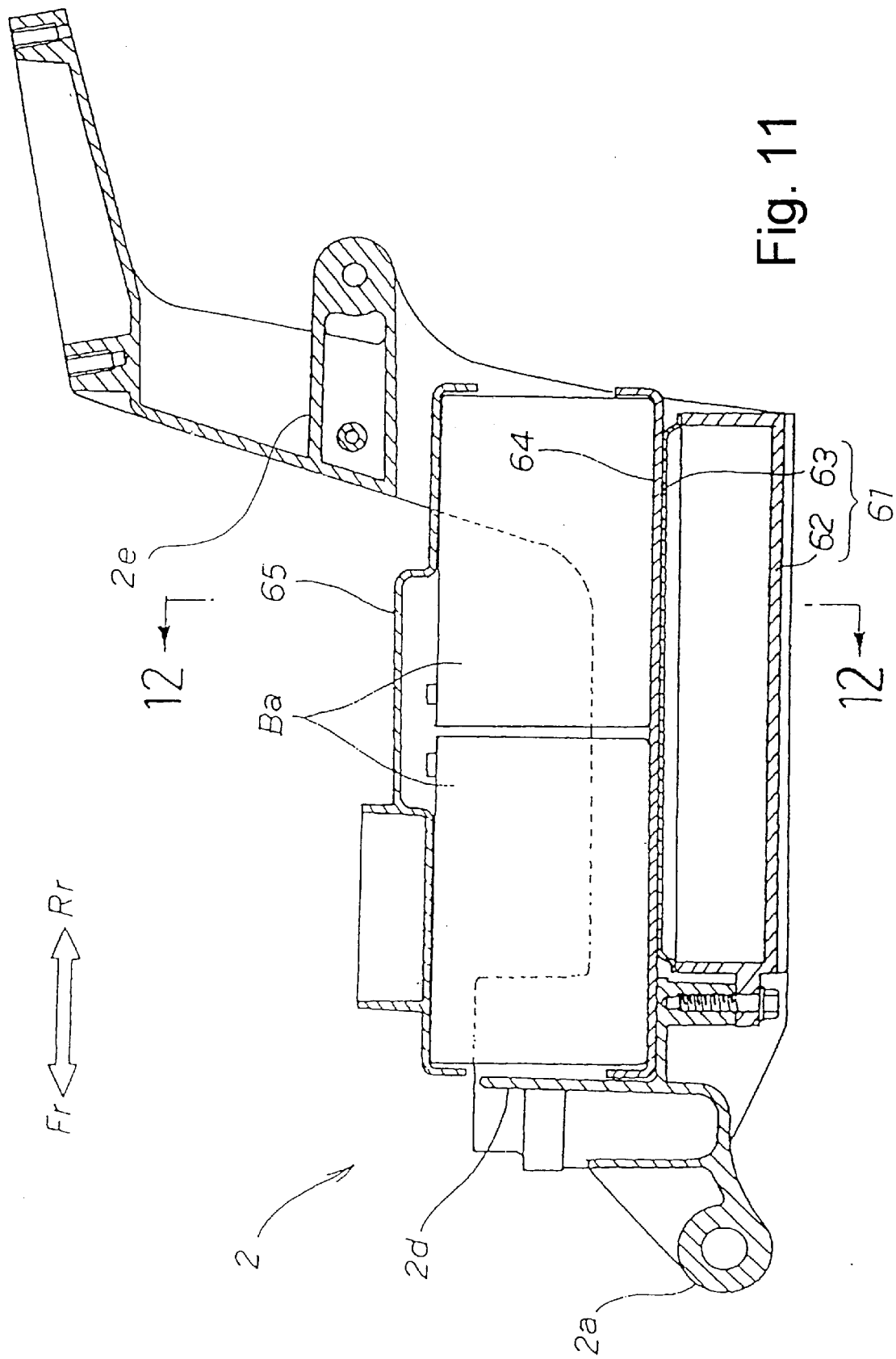
FIG. 11 is a sectional side view thereof.

FIG. 11 is a sectional side view of the main frame with the plural batteries Ba mounted thereon according to the present invention. As shown therein, the rear cross member 2e, which is in the shape of a gateway, straddles the batteries Ba from above.

Figure 12:
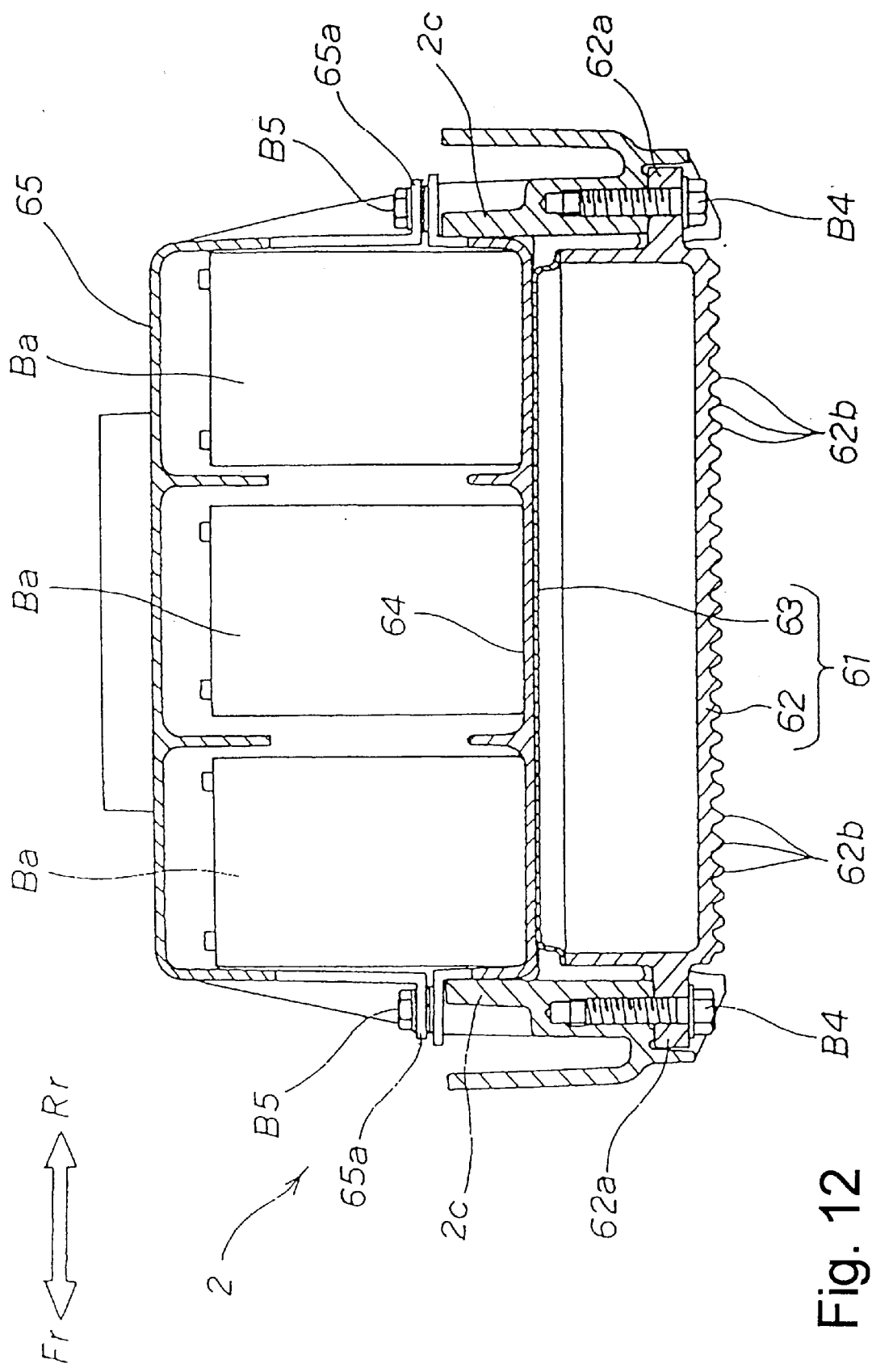
FIG. 12 is a sectional view taken on line 12—12 in FIG. 11.

FIG. 12 is a sectional view taken on line 12—12 in FIG. 11, showing that the main frame 2 in a bottom extracted shape has been closed with the receptacle case 61. The receptacle case 61 is formed of a light alloy for accommodating a unit (not shown) including electronic circuits for driving and controlling the motor 6b (see FIG. 1). The case 61 comprises a case body 62 and a lid 63 for closing the upper portion of the case body 62. The case 61 is inserted from below into the opening of the main frame 2, and flanges 62a of the case body 62 are secured to the underside of the main frame 2 with bolts B4.

A combined structure of the receptacle case 61 and the unit received therein will hereinafter be referred to as the "control unit." As described above, the vehicle body frame 57 extends lower than the head pipe 52 and is then provided with the paired right and left side members (frames) 2c, 2c substantially in parallel with the ground surface.

In the present invention, a control unit is fixed at a lower position between the right and left side members 2c, 2c, spanning both side members, and the plural batteries Ba are mounted on the control unit. Further, a resinous partition plate 64 for partitioning the plural batteries Ba is arranged on the main frame 2 and is secured to the upper surface of the main frame with bolts B5. It should be noted that the use of the partition plate 64 is optional.

The plural batteries Ba are covered with a battery cover 65, and flanges 65a of the battery cover 65 are secured to the upper surface of the main frame 2 with bolts B5. As described above, since most of the batteries Ba are placed on the receptacle case 61 serving also as a bottom plate of the main frame 2, it is not necessary to provide a tray or the like to receive the batteries, thus permitting a reduction in the number of components used. Also, since the bottom of the main frame 2 is closed with the receptacle case 61, the rigidity of the main frame 2 is enhanced.

Moreover, since the receptacle case 61 is exposed below the main frame 2, the heat radiation from the control unit is enhanced. Heat radiating fins 62b formed on the underside of the receptacle case 61 contribute to a further enhancement of the heat radiation. Additionally, since the case 61 is formed of a light alloy superior in heat conductivity, the heat generated from the batteries Ba can be easily dissipated.

Figure 13A:
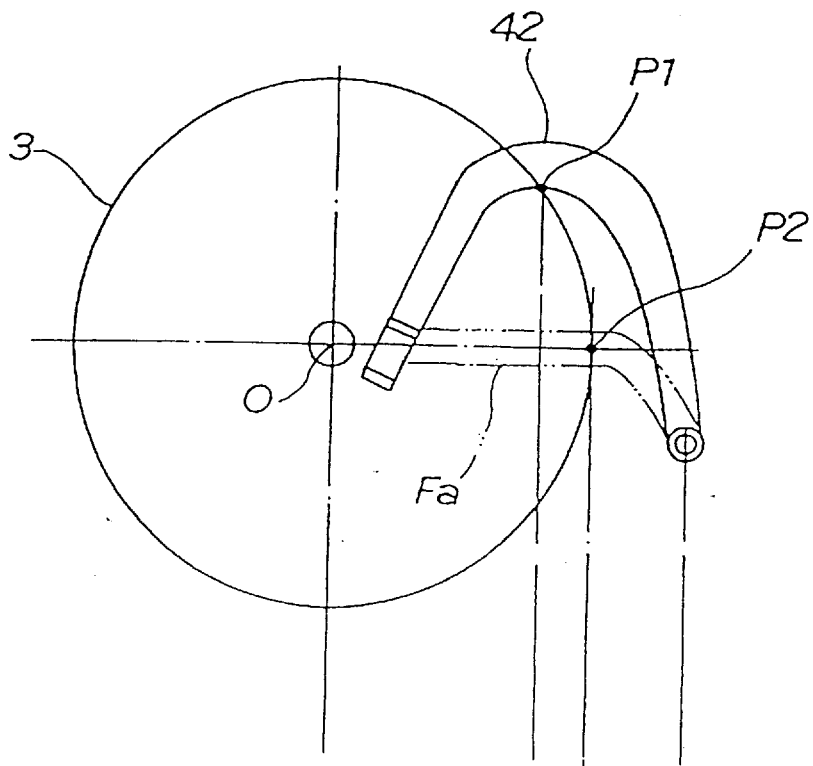
FIGS. 13(a), 13(b) and 13(c) are explanatory views showing a relation between a front swing arm and a front wheel.

Next, the reason why the front swing arm 42 is formed generally in an inverted U shape when seen sideways will be set forth below with reference to FIG. 13. FIGS. 13(a) to 13(c) are explanatory views showing a relation between the front swing arm 42 and the front wheel 3. In FIG. 13(a), the member indicated with a solid line is the front swing arm 42 of the present invention, while the member shown in phantom is a front swing arm Fa as a comparative example. Since the front swing arm 42 is formed generally in an inverted U-shape when viewed from the side, the front swing arm and the outer peripheral edge of the front wheel 3 overlap each other at the point P1 close to the front wheel center O. On the other hand, the front swing arm Fa extends horizontally at the central height of the front wheel 3. The front swing arm Fa and the outer peripheral edge of the front wheel 3 overlap each other at the point P2 farthest from the front wheel center O.

Figure 13B:
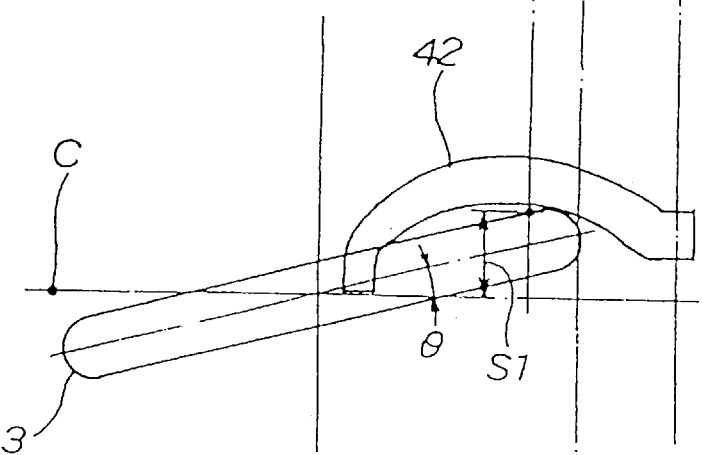
Figure 13C:
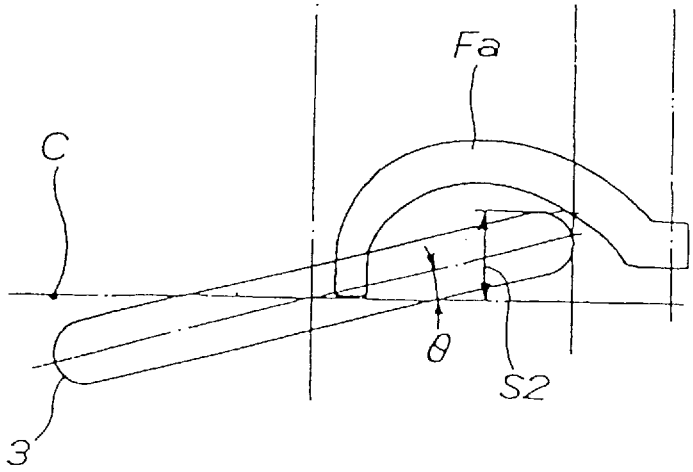

FIG. 13(c) is a plan view showing a relation between the front swing arm Fa as a comparative example and the front wheel 3. When the front wheel 3 is turned at a steering angle of θ, a slant distance S2 from the vehicle body center C up to the outer edge of the front wheel 3 is S2. It is necessary that the front swing arm Fa bypass the front wheel 3 by the large slant distance S2. Therefore, the amount of projection of the front swing arm Fa in the vehicular transverse direction is large.

FIG. 13(b) is a plan view showing a relation between the front swing arm 42 of the present embodiment and the front wheel 3. The front swing arm 42 and the outer peripheral edge of the front wheel 3 overlap each other at the position of point P1, so when the front wheel is turned at the steering angle of θ, the slant distance from the vehicular body center C up to the outer edge of the front wheel 3 is S1, which is smaller than the slant distance S2 in the above comparative example. Therefore, it suffices for the swing arm 42 to bypass the front wheel 3 by the small slant distance S1, and hence the amount of projection of the front swing arm 42 in the vehicular transverse direction may be small, with the result that the size of the two-wheeled motor vehicle becomes smaller.

As noted above, the front swing arm 42 and the outer peripheral edge of the front wheel 3 overlap each other at a higher position (the position of point P1) than the front wheel center O. In this overlapping position, the deflection of the front wheel 3 when steered is smaller than that of the outer peripheral edge of the front wheel at the height of the front wheel center O. Therefore, it suffices for the front swing arm 42 to bypass the front wheel 3 at a position where the deflection of the front wheel is small.

Now, the operation of the front suspension system 4 will be described below with reference to FIGS. 4 and 7. The front damper 45 shown in FIG. 4 attenuates the amplitude of vibration in the swing direction of the front swing arm 42. Additionally, as shown in FIG. 7, an impact force in the upper swing direction of the front swing arm 42 is transmitted to the resin spring 44 from the back of the front swing arm, while an impact force in the lower swing direction of the front swing arm is transmitted to the resin spring 44 from the holding plate 49. At this time, the resin spring 44 undergoes an elastic deformation and exhibits a spring action to cushion the impact forces.

Thus, in the front suspension system 4, impact forces are cushioned by the resin spring 44, and the amplitude of vibration is attenuated by the front dampe 45. In this way, the resin spring 44 displays its spring action with a small stroke corresponding to only its elastic deformation, thus making it possible to cope with a wide range of small to large loads. The resin spring 44 is extremely small in size as compared with a coiled spring.

Consequently, in comparison with a conventional suspension having both a coiled spring and a damper incorporated integrally therein, a small stroke suffices in the present suspension over a wide range of loads. Additionally, since the front suspension being considered is of a small size, it can be installed easily in a narrow space.

In the above embodiment the power unit 6 may include the motor 6b alone as a drive source. The above construction of the present invention brings about the following effect that since a control unit for driving the motor is fixed at a lower position to span between the pair of right and left frames, and batteries for the supply of electric power to the motor are mounted on the control unit, it is possible to let the control unit serve also as a bottom plate between the paired right and left frames, and the batteries can be plaaced thereon. Consequently, it is no longer necessary to use a separate frame or member for mounting batteries thereon, thus leading to the reduction in weight of the vehicle body and in the number of components used.

Moreover, since the control unit closes the bottom of the main frame, the rigidity of the main frame is enhanced. Additionally, since the control unit is exposed below the main frame and is cooled effectively by traveling air, the heat generated is dissipated.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A battery receptacle structure for a two-wheeled motor vehicle, said vehicle having a power unit including a motor, said battery receptacle comprising:
   a vehicle body frame, said vehicle body frame extending downward from a head pipe;
   a pair of right and left frames extending substantially parallel to the ground surface; and
   a control unit for driving the motor, said control unit being fixed to span between said pair of right and left frames, wherein at least one battery for the supply of electric power to the motor is supported by said control unit.

2. The battery receptacle structure according to claim 1, further comprising an upper cover member extending between said right and left frames for enclosing said control unit.

3. The battery receptacle structure according to claim 2, further comprising a battery receiving tray located between said right and left frames for receiving said at least one battery thereon.

4. The battery receptacle structure according to claim 3, wherein said battery receiving tray is configured to receive a plurality of batteries thereon.

5. The battery receptacle structure according to claim 3, further comprising a bottom cover extending between said right and left frames and spaced from a lower side of said battery receiving tray.

6. The battery receptacle structure according to claim 5, wherein said battery receiving tray, said right and left frames and said bottom cover form a housing for enclosing components of said control unit therein.

7. The battery receptacle structure according to claim 6, wherein said bottom cover includes a plurality of fins extending thereon for radiating heat from said bottom cover.

8. The battery receptacle structure according to claim 1, further comprising:

a front cross member interconnecting forward portions of each of said right and left frames, and a rear cross member interconnecting rearward portions of each of said right and left frames.

9. The battery receptacle structure according to claim 8, wherein said rear cross member extends obliquely upwardly and rearwardly from said right and left frames.

10. The battery receptacle structure according to claim 8, wherein said head pipe extends obliquely upwardly and forwardly from said front cross member.

11. The battery receptacle structure according to claim 8, further comprising at least one removable fastener for attaching said head pipe to said front cross member, whereby said fastener may be removed for replacement of said head pipe.

12. The battery receptacle structure according to claim 8, further comprising an upper cover member extending between said right and left frames for enclosing said at least one battery.

13. The battery receptacle structure according to claim 8, further comprising a battery receiving tray located between said right and left frames for receiving said at least one battery thereon.

14. The battery receptacle structure according to claim 13, wherein said battery receiving tray is configured to receive a plurality of batteries thereon.

15. The battery receptacle structure according to claim 13, further comprising a bottom cover extending between said right and left frames and spaced from a lower side of said battery receiving tray.

16. The battery receptacle structure according to claim 15, wherein said battery receiving tray, said right and left frames and said bottom cover form a housing for enclosing components of said control unit therein.

17. The battery receptacle structure according to claim 15, wherein said bottom cover includes a plurality of fins extending thereon for radiating heat from said bottom cover.

18. The battery receptacle structure according to claim 8, further comprising an upper cover member extending between said right and left frames for enclosing said at least one battery, and a battery receiving tray located between said right and left frames for receiving a plurality of batteries thereon.

19. The battery receptacle structure according to claim 18, further comprising a bottom cover extending between said right and left frames and spaced from a lower side of said battery receiving tray, said bottom cover including a plurality of fins extending thereon for radiating heat from said bottom cover, wherein said battery receiving tray, said right and left frames and said bottom cover form a housing for enclosing components of said control unit therein.

20. The battery receptacle structure according to claim 1, further comprising:

a front cross member interconnecting forward portions of each of said right and left frames, and a rear cross member interconnecting rearward portions of each of said right and left frames, said rear cross member extending obliquely upwardly and rearwardly from said right and left frames;

said head pipe extending obliquely upwardly and forwardly from said front cross member;

a battery receiving tray located generally between said right and left frames for receiving said at least one battery thereon;

an upper cover member extending generally between said right and left frames for enclosing said at least one battery; and a bottom cover extending generally between said right and left frames and spaced from a lower side of said battery receiving tray to form a housing for enclosing components of said control unit therein, said bottom cover including a plurality of fins extending therefrom for radiating heat from said bottom cover.

\* \* \* \* \*